(12) United States Patent
Moelkner et al.

(10) Patent No.: US 7,418,871 B2
(45) Date of Patent: Sep. 2, 2008

(54) METHOD FOR DETECTING A PRESSURE OF A MEDIUM AND PRESSURE MEASURING DEVICE

(75) Inventors: Thomas Moelkner, Stuttgart (DE); Holger Scholzen, Stuttgart (DE); Joerg Engelhardt, Ditzingen (DE); Christian Roesser, Grossbottwar (DE); Hans-Peter Didra, Kusterdingen-Jettenburg (DE); Markus Ledermann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/542,364

(22) Filed: Oct. 2, 2006

(65) Prior Publication Data

US 2007/0084291 A1   Apr. 19, 2007

(30) Foreign Application Priority Data

Sep. 30, 2005   (DE) .................. 10 2005 047 091

(51) Int. Cl.
*G01L 9/00* (2006.01)
*H01G 7/00* (2006.01)

(52) U.S. Cl. .................. 73/754; 73/715; 73/716; 73/753; 361/283.1; 361/283.4

(58) Field of Classification Search .......... 73/700–756; 361/283.1–283.4
See application file for complete search history.

(56) References Cited

U.S. PATENT DOCUMENTS

| | | | |
|---|---|---|---|
| 4,895,026 A | | 1/1990 | Tada |
| 6,526,832 B2 * | | 3/2003 | Landgraf et al. ............... 73/754 |
| 6,588,281 B2 * | | 7/2003 | Kurtz et al. .................... 73/754 |

FOREIGN PATENT DOCUMENTS

| | | |
|---|---|---|
| DE | 37 03 685 | 8/1988 |
| DE | 39 28 542 | 3/1990 |

* cited by examiner

*Primary Examiner*—Edward Lefkowitz
*Assistant Examiner*—Jermaine Jenkins
(74) *Attorney, Agent, or Firm*—Kenyon & Kenyon LLP

(57) ABSTRACT

A pressure measuring device for detecting a pressure to be measured of a medium, having a pressure housing; a converter situated in the pressure housing for converting a mechanical force produced by the pressure to be measured into an electrical signal; an output unit for outputting the electrical signal; a separator for separating the medium from the converter; and a transmission device for transmitting the force produced by the pressure to be measured to the converter.

9 Claims, 1 Drawing Sheet

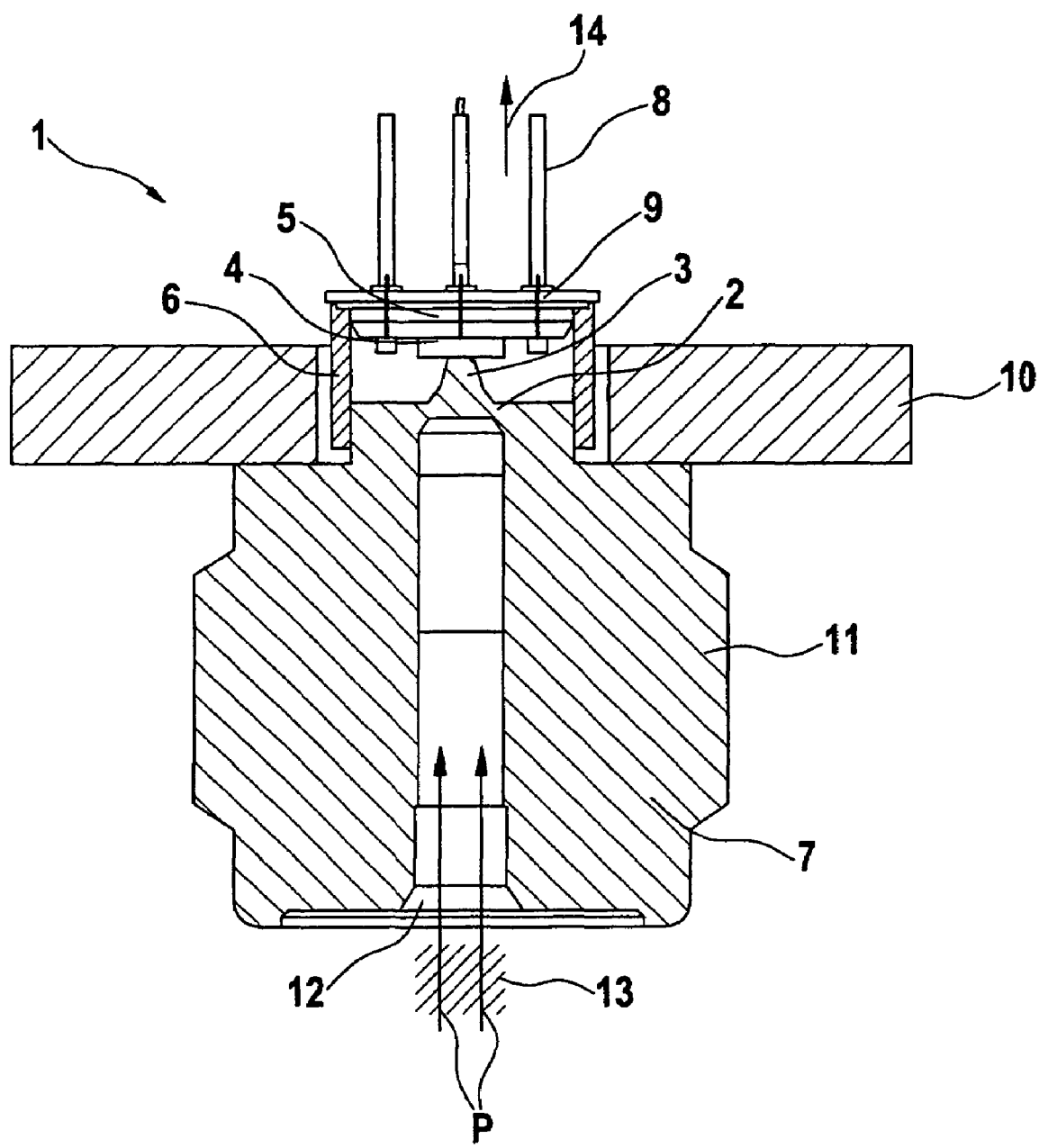

METHOD FOR DETECTING A PRESSURE OF A MEDIUM AND PRESSURE MEASURING DEVICE

FIELD OF THE INVENTION

The present invention relates in general to pressure sensors and in particular to pressure measuring devices having piezoresistive pressure transducers which are suitable for measuring pressures in different media and pressure ranges. Specifically, the present invention relates to a pressure measuring device for detecting a pressure to be measured of a medium, the pressure measuring device having a pressure housing, a converter situated in the pressure housing for converting a mechanical force produced by the pressure to be measured into an electrical signal, and an output unit for outputting the electrical signal corresponding to a pressure of the medium to be measured.

BACKGROUND INFORMATION

Current technologies provide the advantage that micromechanical and microelectronic components can be situated together on a chip (circuit element), for example on silicon chips. Piezoresistive pressure sensors are used in motor vehicles to measure the pressure in different media and pressure ranges. It is important, in particular, for pressure sensors of this type to be very accurate and very sturdy over their entire service lives and also economical to manufacture. According to the piezoresistive measurement principle, four piezoresistive electrical resistors are situated in a suitable location of a pressure measuring diaphragm or are mounted thereon.

The pressure measuring diaphragm is deformed by the pressure applied thereto; a deformation transferred from the pressure measuring diaphragm to the piezoresistive resistors resulting in a change in resistance of the resistors. In a Wheatstone bridge, which is provided as a measuring bridge, these three resistors are interconnected, the measuring bridge being able to be designed in such a way that it outputs an electrical signal as a bridge diagonal voltage which corresponds to the pressure of a medium to be measured. A deformation of the resistors results in a change in their resistance value (known as the piezoresistive effect), which causes the Wheatstone bridge circuit to become unbalanced. The Wheatstone bridge may be designed in such a way that the bridge diagonal voltage produces a signal which is proportional to the pressure applied so that an adjustable characteristic curve can be evaluated in a downstream evaluation circuit (evaluation electronics). Different designs of bridge circuits are known to those skilled in the art.

A technology known as silicon micromechanics makes it possible to efficiently integrate sensor functions such as the diaphragm, piezoelectric resistors, and evaluation circuit or evaluation electronics onto a single circuit chip (a single electronic circuit unit). This single-chip principle substantially reduces the cost of a pressure sensor of this type, due to the simple micromechanical and microelectronic structure. For example, there is no need for an additional circuit board, which would otherwise include the evaluation circuit; in addition, it is not necessary to establish contact between the evaluation circuit and circuit board over great distances.

A disadvantage of single-chip sensors of this type, which include both micromechanical and microelectronic components, is that they cannot be operated at high temperatures (usually not at temperatures above 150° C.), due to the microelectronic components situated thereon. Another disadvantage is the fact that aggressive media cannot be measured using these types of pressure sensors based on single-chip systems. The inability to detect pressures in the range above 10 bar is also unsuitable, since the single-chip systems are exposed to high mechanical forces in such a high pressure range.

A conventional pressure sensor, which is also designed for detecting pressure differences, is described in German Patent No. DE 39 28 542. The pressure sensor has a diaphragm on which sensor elements are mounted on the top and bottom, which are provided, for example, as interconnected piezoresistive resistors whose resistance changes due to diaphragm expansion. A diaphragm expansion of this type, and thus a change in the circuit resistance, is a measure of the pressure to be measured or the pressure difference to be measured.

The pressure difference sensor described in U.S. Pat. No. 4,895,026 can be used only in the case of low pressure differences, this sensor being disadvantageously provided with two different measuring diaphragms.

To be able to use conventional pressure sensors at high temperatures, in aggressive media, or to measure high pressures (above 10 bar), such pressure sensors are provided, according to the related art, with a metallic separating diaphragm on the back of which piezoresistive resistors are mounted. Thus, German Patent No. DE 37 03 685 describes a pressure sensor in which a resistant separating diaphragm is situated between the medium to be measured and the side of the measuring diaphragm facing the medium, the intermediate space being filled with an incompressible medium. This makes it possible to measure the pressure of even aggressive and/or corrosive media.

A considerable disadvantage of such pressure sensors is that they have a very complex design and, due to effects of the ambient conditions on the incompressible medium, which is used as an intermediate medium, an insufficient level of accuracy is achieved.

Piezoresistive resistors are conventionally mounted on the back of the separating diaphragm used as a protecting device. These resistors can be metallic or silicon resistors which are mounted by sputtering, bonding, or glazing. A structure of this type disadvantageously means that the evaluation circuit for evaluating the electrical signals supplied by the resistance sensors requires an additional circuit board.

SUMMARY OF THE INVENTION

An object of the present invention is therefore to easily, cost-effectively, and reliably separate the measuring medium from the measuring element (piezoresistive resistors) and from the evaluation circuit. This provides the advantage that measurements may be effected in media which are too aggressive or too hot or have too high a pressure for the use of silicon pressure sensors.

In particular, the present invention has the advantage that pressures in different media and in different pressure ranges are measurable. The advantages of silicon micromechanics, which lie in an economical construction, a single-chip system, and a simple design, may therefore be expediently combined with the advantages of a construction using a metallic separating diaphragm, the advantages of the metallic separating diaphragm lying in the ability to take measurements at elevated temperatures, elevated pressures, and in more aggressive media.

The provision of a metallic separator to separate the medium to be measured from a converter which is used to convert a mechanical force produced by the pressure to be measured into an electrical signal enables a separator of this type to be easily adjusted to different pressure ranges (from just a few bar to several thousand bar) via geometric designs. In this case, the diaphragm thickness, transition radii, and diaphragm size are varied.

Another important advantage of the pressure measuring device according to the present invention is that the cost of both the measuring element and the remaining structure may be minimized by using the micromechanical pressure measurement principle and an integrated evaluation circuit for converting the compressive force into an electrical signal.

Piezoresistive resistors advantageously do not have to be mounted on the metal diaphragm. This results in the advantage that the metal diaphragm is easily integratable into the connector of the pressure sensor. This eliminates the need to design the diaphragm only according to mechanical requirements for mounting the resistors and not additionally according to process requirements. Another suitable feature is that there is no need for a weld between the diaphragm and the connector, which lowers the process costs. A further advantage of eliminating the weld is that it also eliminates the need for a limiting element under a maximum possible pressure load.

Furthermore, it is possible to integrate a transmission device designed as a plunger into the connector diaphragm, which improves the positioning accuracy from the silicon chip to the plunger. Additional tolerances due to positioning and fixing the plunger on the connector are eliminated entirely.

The pressure measuring device according to the present invention for detecting a pressure to be measured of a medium has a pressure housing, a converter situated in the pressure housing for converting a mechanical force produced by the pressure to be measured into an electrical signal and an output unit for outputting the electrical signal according to a pressure of the medium, a separating device for separating the medium from the converter, and a transmission device for transmitting the mechanical force produced by the pressure to be measured to the converter being provided.

The pressure measuring device may also be designed to include a second transmission device for transmitting a second mechanical force produced by a second pressure to be measured to the converter, a pressure difference between the pressure to be measured and the second pressure to be measured being detectable.

It is advantageous to design the separator for separating the medium from the converter as a separating diaphragm. The separator for separating the medium from the converter, and the transmission device for transmitting the mechanical force produced by the pressure to be measured to the converter, are preferably designed as an integral unit.

It is also possible to construct the separator, the converter for converting a mechanical force produced by the pressure to be measured into an electrical signal, and a measuring transducer in such a way that they are integrated with evaluation electronics. In this case, it is particularly suitable to provide the separator, converter, and measuring transducer integrated with the evaluation electronics on a silicon chip in a silicon-based micromechanical structure.

The transmission device for transmitting the mechanical force produced by the pressure to be measured to the converter is preferably designed as a plunger mounted on the separator.

The output unit for outputting the electrical signal according to a pressure of the medium may be provided via terminal pins which are protected by a protecting device. The pressure housing includes at least one pressure channel for applying at least one pressure to the converter. The medium whose pressure is to be measured may be in a gaseous or a liquid state of aggregation.

BRIEF DESCRIPTION OF THE DRAWINGS

The FIGURE shows a cross section of a pressure measuring device for detecting a pressure of a medium to be measured, according to a preferred exemplary embodiment of the present invention.

DETAILED DESCRIPTION

The FIGURE shows a cross section of a pressure measuring device 1 according to a preferred exemplary embodiment of the present invention.

In FIG. 1, a reference numeral 11 designates a pressure housing in which a pressure channel 12 is provided, via which a pressure p of a medium to be measured 13 is detectable. Furthermore, a fastening element 10, for example in the form of a hexagon screw, is mounted on pressure housing 11 and may be used to attach the entire pressure measuring device 1 to an object. Pressure measuring device 1 also has a separator 2 which separates medium 13 from a converter 4.

Converter 4 is situated in pressure housing 11 and is designed to convert a mechanical force produced by pressure p to be measured into an electrical signal 14. Electrical signal 14 is output via an output unit 8. A reference numeral 7 designates the connector used to attach the pressure measuring device to an object (measured object).

A protecting device 9 protects output unit 8, which may be designed as terminal pins, against mechanical, chemical, and/or corrosive effects. According to the present invention, a transmission device 3, in the form of a plunger, is mounted on separator 2 and is brought into contact with the converter, which is designed as a silicon chip.

Pressure measuring device 1 according to the present invention has a signal conversion chain as follows: By deforming separator 2, which is designed as a metallic separating diaphragm, pressure p of a medium to be measured 13 is converted to an axial movement of the plunger mounted on separator 2 (transmission device 3). This type of axial movement of transmission device 3 results in a pressure on converter 4, i.e., a micromechanical silicon chip which is mounted on a holding device 5 (a header) in the form of a mechanical support. A pressure on converter 4 produces an expansion of the piezoresistive resistors mounted thereon. The piezoresistive or Si resistors are interconnected in the form of a Wheatstone bridge circuit, an integrated evaluation circuit which converts electrical signal 14 to an electrical characteristic curve being provided on silicon chip 4, i.e., the converter.

Holding device 5 is connected to connector 7 via a pretensioning sleeve 6 in such a way that a frictional connection is thereby established. The pressure signal is transmitted by bonds (not illustrated) in the form of an electrical signal 14 via output unit 8 (i.e., terminal pins) to a plug-in device (not shown). To protect terminal pins 8, the latter are glazed in an electrical insulation provided as a protecting device 9.

According to the present invention, the metallic separating diaphragm (i.e., the separator) is advantageously part of connector 7 and is designed in such a way that an axial movement of the transmission device 3 (i.e., the plunger) suitable for the evaluation in converter 4 (silicon chip) is provided, depending on the required pressure range. An axial movement of this type is preferably in the range of several micrometers, such that a strength of the material of separator 2, i.e., the diaphragm material, is not exceeded. In contrast to methods according to the related art, in which the piezoresistive resistors or silicon resistors are mounted directly on the separator, i.e., separating diaphragm, it is not necessary, according to the pressure measuring device according to the present invention, for the diaphragm to undergo high mechanical expansion to obtain a strong and therefore less interference-susceptible sensor signal. The advantage of avoiding high material stress or material fatigue is thereby achieved.

In designing the pressure measuring device according to the present invention, converter 4 in the form of a silicon chip must be pressed under pre-tension against transmission device 3, i.e., the plunger, in such a way that a defined pre-tension state remains constant for the entire life of the pressure measuring device. The pre-tension is necessary to prevent transmission device 3 from being lifted and set down again on converter 4 for all operating states encompassing the different temperatures, temperature changes, and vibrations. This avoids a nonlinear characteristic and possibly also permanent damage to converter 4.

A change in pre-tension over the entire service life causes a drift in the offset of the pressure measuring device and thus a measuring error, which should not exceed a certain amount, depending on the sensor application. The structure of a pressure measuring device according to a preferred exemplary embodiment of the present invention, as shown with reference to FIG. 1, includes converter 4, connected to holding device 5 and pre-tensioning sleeve 6, in such a way that the pre-tension is achievable by stretching pre-tensioning sleeve 6 or by bending holding device 5 or by both effects. Pre-tensioning sleeve 6 is preferably fastened to connector 7 by welding or tacking.

It is also advantageous, in the case of the pressure measuring device according to the present invention, to design a force path between separator 2 and holding device 5 in such a way that it is short, thus minimizing measuring errors produced by thermal expansion and temperature gradients. At the same time, care must be taken when selecting the material for pre-tensioning sleeve 6 to ensure that the latter's coefficient of thermal expansion properly matches the coefficients of thermal expansion of pre-tensioning sleeve 6 and converter 4 to avoid stresses during temperature variations. Measuring errors are thereby minimized.

Designing the pressure measuring device according to the present invention via pre-tensioning sleeve 6 also achieves optimum mechanical decoupling of the force path from ambient influences such as screw-in torque, thermal expansion, etc., since the force path is mechanically decoupled to the greatest possible extent from fastening element 10, which is designed for example as a hexagon screw, and from pressure housing 11, which has for example a screw thread.

To improve electromagnetic compatibility, capacitors may be provided without a great deal of additional complexity on the back of holding device 5 between output units 8 designed as terminal pins.

LIST OF REFERENCE NUMERALS

1 Pressure measuring device
2 Separator
3 Transmission device
4 Convertor
5 Holding device
6 Pre-tensioning sleeve
7 Connector
8 Output unit (terminal pins)
9 Protecting device
10 Fastening element
11 Pressure housing
12 Pressure channel
13 Medium to be measured
14 Electrical signal

What is claimed is:

1. A pressure measuring device for detecting a pressure to be measured of a medium, comprising:
    a) a pressure housing;
    b) a converter situated in the pressure housing for converting a mechanical force produced by the pressure to be measured into an electrical signal;
    c) an output unit for outputting the electrical signal corresponding to the pressure of the medium;
    d) a separator for separating the medium from the converter;
    e) a transmission device for transmitting the mechanical force produced by the pressure to be measured from the medium to the converter; and
    f) a second transmission device for transmitting a second mechanical force produced by a second pressure to be measured to the converter and for detecting a pressure difference between the pressure to be measured and the second pressure to be measured.

2. The device according to claim 1, wherein the separator for separating the medium from the converter includes a separating diaphragm.

3. The device according to claim 1, wherein the separator for separating the medium from the converter, and the transmission device for transmitting the mechanical force produced by the pressure to be measured to the converter, are designed as an integral unit.

4. The device according to claim 1, wherein the separator has the converter for converting a mechanical force produced by the pressure to be measured into an electrical signal and measuring transducers integrated with an evaluation electronics.

5. The device according to claim 4, wherein the separator, the converter, and the measuring transducers are integrated with the evaluation electronics on a silicon chip in a silicon-based micromechanical structure.

6. The device according to claim 1, wherein the transmission device for transmitting the mechanical force produced by the pressure to be measured to the converter includes a plunger mounted on the separator.

7. The device according to claim 1, wherein the medium is present in one of a gaseous and a liquid state of aggregation.

8. The device according to claim 1, wherein the output unit for outputting the electrical signal corresponding to the pressure of the medium includes terminal pins protected by a protecting device.

9. The device according to claim 1, wherein the pressure housing includes at least one pressure channel for applying at least one pressure to the converter.

* * * * *